Oct. 13, 1931.　　　H. G. ROBINSON　　　1,827,715
STOP MECHANISM FOR BRAIDING MACHINES
Original Filed Sept. 24, 1926　　3 Sheets-Sheet 1

Oct. 13, 1931.    H. G. ROBINSON    1,827,715
STOP MECHANISM FOR BRAIDING MACHINES
Original Filed Sept. 24, 1926    3 Sheets-Sheet 2

HARRY G. ROBINSON, INVENTOR
BY
ATTORNEY

Oct. 13, 1931.    H. G. ROBINSON    1,827,715
STOP MECHANISM FOR BRAIDING MACHINES
Original Filed Sept. 24, 1926    3 Sheets-Sheet 3

INVENTOR
HARRY G. ROBINSON,
BY
ATTORNEY

Patented Oct. 13, 1931

1,827,715

UNITED STATES PATENT OFFICE

HARRY G. ROBINSON, OF WATERBURY, CONNECTICUT, ASSIGNOR TO INDUSTRIES OF AMERICA, INC., A CORPORATION OF DELAWARE

STOP MECHANISM FOR BRAIDING MACHINES

Original application filed September 24, 1926, Serial No. 137,395, and in Germany and France September 9, 1927. Divided and this application filed February 20, 1928. Serial No. 255,728.

This invention relates to braiding machines, and has for an object the provision of an improved braiding machine of the type in which braiding carriers are moved in intersecting sinuous paths by means of rotating drivers with devices which hold the respective carriers against the drivers at their peripheries through a portion of their rotation, and which release the carriers at appropriate transfer regions where a carrier is passed from one driver to another and is thereby carried in a reversely curved part of the sinuous path until the carrier is again transferred to the next driver of the series, and so on throughout the system of drivers.

An object of the invention is to provide the carriers with terminal flanges adapted to be held in recesses near the upper faces of the actuating drivers, and to be gripped therein by means carried on the hubs of the drivers, and acting to force the flanges against the under surfaces of removable plates covering the recesses, the machine being organized to permit unusually ready removal of the carriers for purposes of changing the carriers or inspecting the underlying parts without undue disorganization of the machine.

Another object of the invention is to provide a machine adaptable to the manufacture of a wide variety of products, including flat and tubular braids or tapes, and which can be used in the production of such different articles as flat wire tape for tire beads, sheathing for insulated electrical conductors and delicate ric-rac in diverse patterns.

Still another object is to provide a machine which can be operated reliably at extremely high speeds and with a minimum of friction and noise, by operators of less than average skill.

An object of the present invention is to provide an extremely sensitive detector mechanism adapted to stop the machine quickly upon failure of the supply or upon arrival of a defective portion of thread, before the defect can result in a flaw in the final product.

A further object of the invention is to provide means for applying to the thread, yarn, or other material, as it is delivered from a supply carrier or other source of supply to the braiding or other mechanism in which the material is to be used, a tension which will be of a uniform character, the let-off arrangements being characterized by means for controlling them positively and with great sensitiveness, so that the supply will respond quickly and accurately to the demand while a uniform tension is maintained.

Certain of the features herein illustrated form the subject of claims in my Patent No. 1,693,121, issued Nov. 27, 1928, upon the co-pending application Ser. No. 137,395, filed Sept. 24, 1926, from which my present application has been divided, and other features are claimed in my Patent No. 1,791,286, issued Feb. 3, 1931, upon a co-pending application Ser. No. 255,727, which has also been divided from said application Ser. No. 137,395.

The above features, and others, are illustrated and described fully in the accompanying drawings and specification and are pointed out in the claims.

Figure 1:
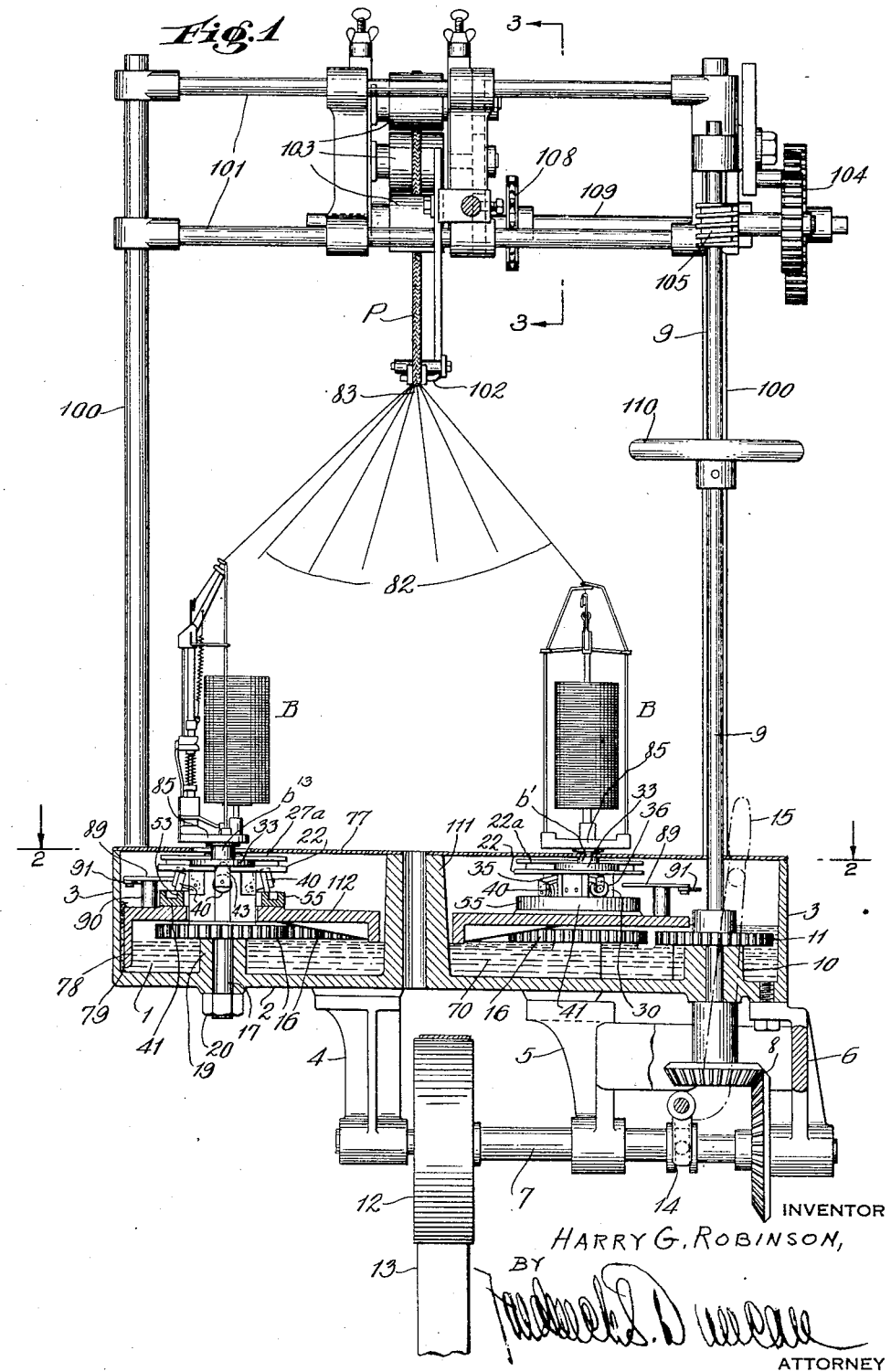
Fig. 1 is a view in vertical section of a braiding machine in the construction of which the invention has been embodied, with parts shown in elevation.

In the illustrated embodiment, the part designated by the reference numeral 1 is the casing adapted to enclose the actuating parts of a braiding machine, approximately circular in form and comprising a bottom part 2 with side walls 3 and having brackets 4, 5 and 6 to support the horizontal drive shaft 7 which is geared at 8 to a vertical shaft 9 extending up through a boss 10 and provided with a spur gear 11 which constitutes the main driving gear of the braiding mechanism. A pulley 12 on the shaft 7 may be driven by a belt 13, and at 14 is provided a controlling clutch operated by a shipping lever 15.

Figure 2:
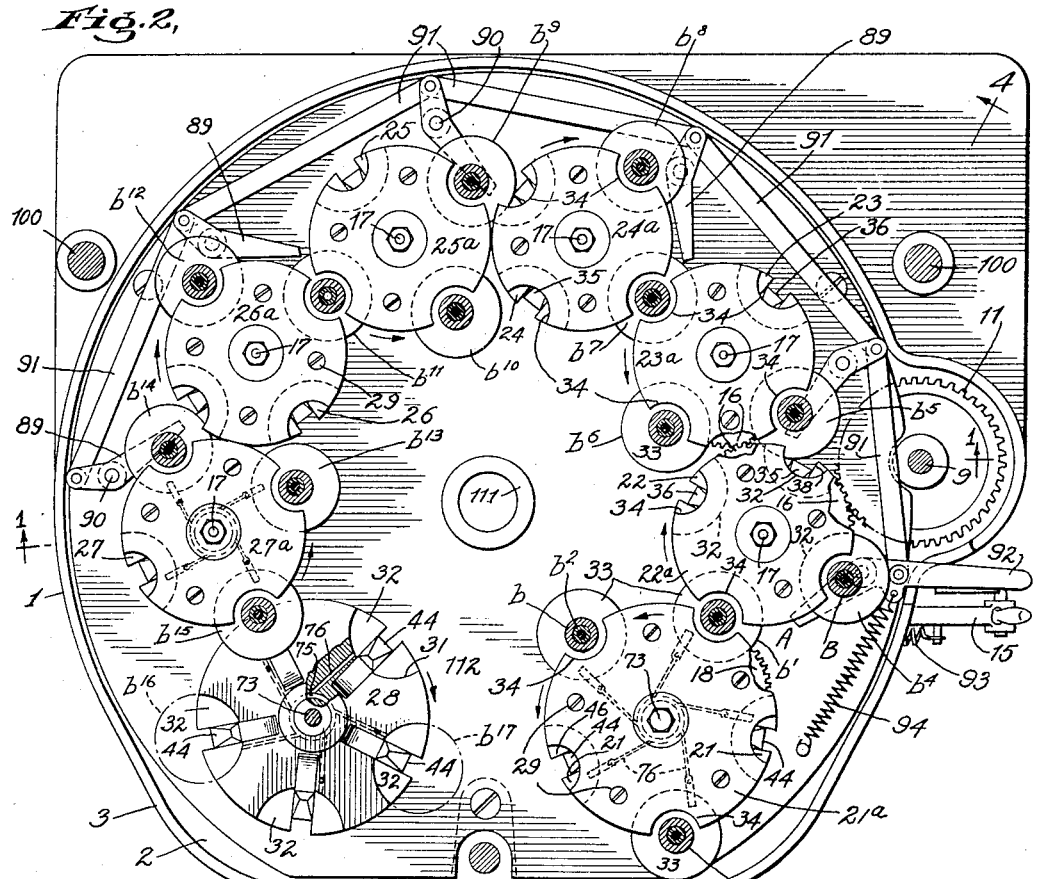
Fig. 2 is a horizontal section on the line 2—2 of Fig. 1, upon an enlarged scale.
Figure 4:
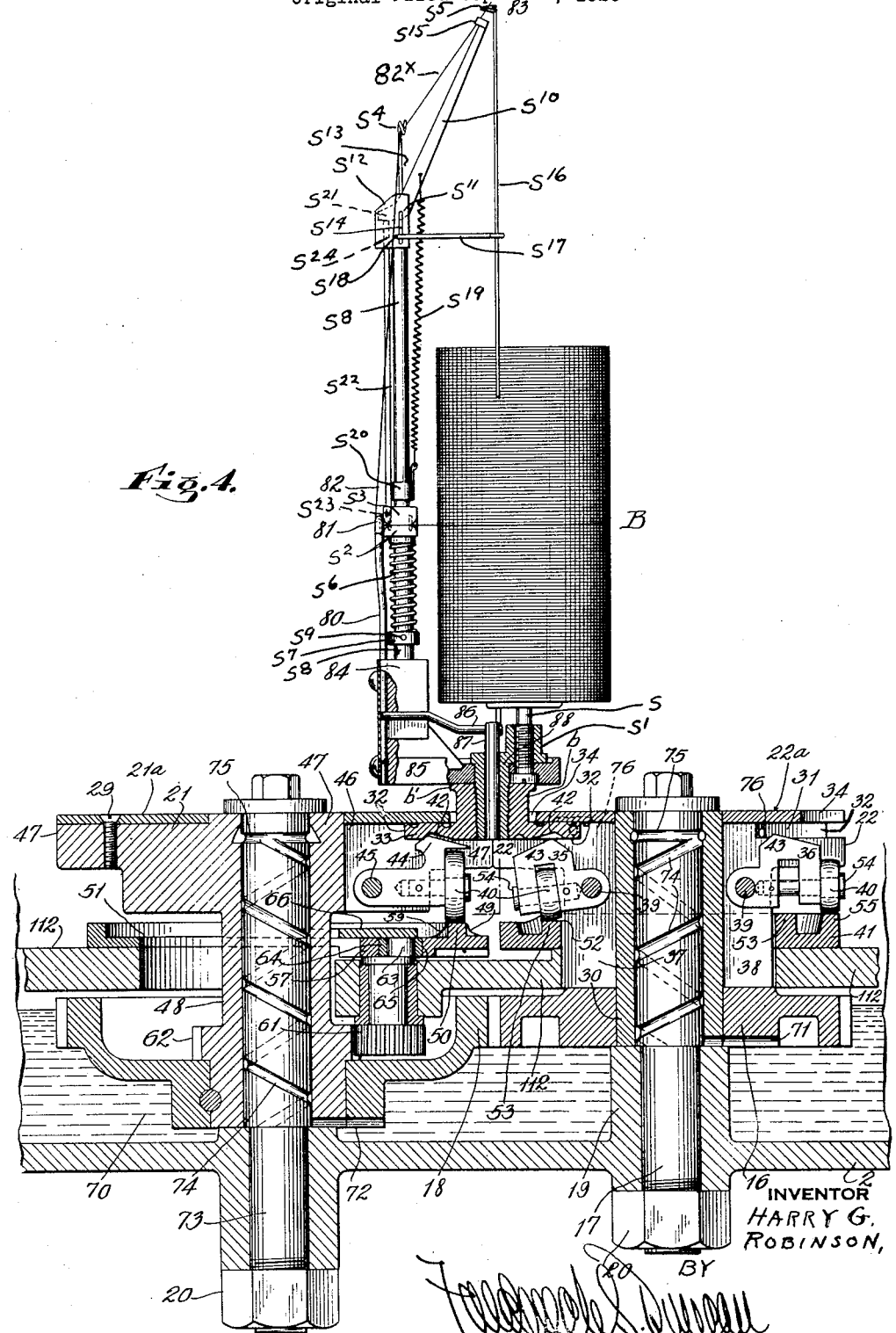
Fig. 4 is a fragmentary, detail view in vertical section, on an enlarged scale, taken on the line 4—4 of Fig. 2.

Referring to Fig. 2, it will be seen that the main driving gear 11 meshes with a spur gear 16 upon a bearing stud 17, driving the gear 16 and driving thereby the gear 18 at one side of gear 11, and also the chain of gears 16 on the other side which are mounted rotatably upon bearing studs 17 in an approximately circular arrangement within the casing 1, to the bottom 2 of which the studs are secured in bosses 19 by suitable nuts 20, as shown in Figs. 1 and 4.

In pursuance of the invention, a series of carrier driver disks is provided for actuation by the gears 16 and 18, and of these disks there may be any suitable number, eight being shown in the illustrated embodiment, numbered 21 to 28, these disks being supported in such a manner as to permit the attachment to their upper faces of flanged carrier members $b^1$ to $b^{17}$, in the manner best understood by reference to Fig. 4, which illustrates also a preferred type of braider unit supported by the carrier $b^1$ and designated generally by the reference character B.

The driver disks 22 to 27 are preferably of substantially identical construction throughout the series, and similarly connected with their respective gears 16, so that the following description of the now preferred form of structure associated with the driver disk 22 will serve as a description of each.

The driver 22 is preferably formed integrally with a hub 30 co-axial with the gear 16, and is provided with four arcuate peripheral recesses 32 to receive the flange 33 with which each of the carrier members $b^1$ to $b^{17}$ is provided, so that as each carrier flange engages with one of the transfer disks its flange 33 enters one of these arcuate recesses 32 and fits snugly against the curved wall 31 thereof, being embraced between the driver 22 and a cover plate 22$^a$, the latter having its periphery cut away at 34 to clear the central post or neck $b$ of the carrier.

In pursuance of an important object of the invention, means are provided to hold the carrier positively against the disk 22 while the same rotates from the transfer point at which it receives the carrier to the transfer point at which the disk passes the carrier on to the adjacent disk, where the carrier is released and is picked up by the adjacent disk and is there held by similar positively acting means.

The now preferred form of holding means comprises two sets of dogs 35 and 36 mounted on pivots 39 in radial slots 37 and 38 formed in the hub 30 of the gear 16, the dogs being formed with yokes in which are antifriction rollers 40 adapted to run upon a cam 41 mounted upon a stationary plate 112 extending horizontally across the casing.

All of these dogs are preferably so formed that by the action of centrifugal force and gravity they will be given a bias downwardly away from the flanges 33 of the carriers, tending normally to occupy the position of the dog 35 in Fig. 4, and in pursuance of the invention the cam 41 is provided with annular face tracks 53 and 55, of a contour respectively adapted to force the dogs 35 and 36 upwardly into the position shown in Fig. 4 at 36. In this position the shoulder 43 of the dog is adapted to enter the annular groove 42 with which the bottom of the carrier flange is provided, and serves when so engaged to prevent displacement of the carrier from the disk, crowding the carrier flange toward the curved wall 31 of the recess 32, and at the same time forcing it firmly upward against the bottom of the plate 22$^a$.

Such engagement is illustrated clearly in the instance of the similar dog 44 pivoted at 45 within a radial slot 46 in the face disk 47 extending from the hub 48 of driver 21, upon which disk is mounted plate 21$^a$, this driver being about to transfer the carrier $b^1$ to the disk 22, for which operation the carrier will be released by the descent of dog 44 when its roller 40 runs down an incline 49 on track 50 of the cam 51, while the pick up of the carrier $b^1$ is simultaneously performed by the dog 35 when its roller 40 runs up the incline 52 of the inner track 53 of cam 41, this double action of the dogs being practically instantaneous, so that no dwell is required, nor is there any shock incidental to loose motion, the carrier being swung into reverse with a smooth, steady continuity of action which causes the machine to operate quietly and reliably, and increases its effective life.

In the particular type of braiding machine selected for illustration, the braiding units are arranged to return upon their courses, in order to make a flat braid for which purpose the disks 21 and 28 serve to accomplish the required change of direction, each carrier being swung around a complete circle by the disk 21 and by the disk 28 at the respective ends of the sinuous path.

Accordingly, each of the disks 21 and 28 has an extra seat 32 and a corresponding number of dogs 44, and means are provided to operate each dog to pick up a carrier at the single transfer point, occupied by the carrier $b^1$ in Figs. 2 and 4, and to release the carrier when the disk 21 has made a complete turn, so that one or more of the dogs 44 are always out of use on alternate rotations of the disk 21, and the same is true of the dogs on disk 28, which are identical in arrangement with those on 21.

A different type of cam motion is required to operate the dogs 44, and as the now preferred form of cam for this purpose, there may be utilized a cam 51 having a single cam track 50 of uniform height throughout its extent except at the region of the transfer point occupied by the carrier $b^1$, (see Fig. 2) where there is a gap in the cam track, occupied by a slide 57 having a plurality of arcuate cam track segments 49 and 59 the inclines of which are brought alternately into position for action, by radial movement of the slide outward and inward between the times of transfer, the roller 40 of the dog running down one incline 49 as the rotation of disk 21 brings the dog 44 near the transfer point, so that the roller 40 runs momentarily on the low path of the cam slide, and at this phase of the rotation of the driver, the dog 44 at that time passing is depressed and then its roller 40 runs up the opposite incline 49, causing the dog 44 to engage and hold one of the carriers $b^1$, etc., this holding action being maintained by track 50 for one complete rotation of the driver 21. Then the inward shifting of the slide 57 brings one of the inclines 59 at the inner portion of the cam slide into registry with the circular part 50 of the cam track, and the roller 40 runs down one incline 59, allowing the appropriate dog 44 to fall and release the carrier $b^1$, or the carrier which is to be transferred to the co-operating driver 22 and that carrier is immediately picked up by the proper dog 35 on the driver 22, and which is swung around with the disk 22, until the transfer point to driver 23 is reached, and so on.

As suitable means to effect the required reciprocation of the slide 57, I have shown a gear 61 meshing with a gear 62 on the hub 48, and provided with a crank-pin 63 and slide-block 64 working in a slot 65 of the slide 57, a plate 66 being fastened upon the cam part 68 to hold the parts in assembled relation.

The ratio of the gear 61 to gear 62 is two and one half to one, so that the slide 57, and its shoulders 49 and 59, makes five complete reciprocations for each two rotations of the disk 21; and thus each dog 44 is raised and lowered once upon each complete rotation of the disk.

This insures that each carrier shall be picked up by disk 12 at a transfer point and carried completely around to the same transfer point and released for transfer after one such complete rotation of the disk.

The disks 21 and 28 may be provided with a different number of dogs than that shown, and the gear-ratio will be then varied according to the work to be performed.

Provision is made for automatic lubrication of the various operating parts, preferably by the means now to be described:

The casing 1 serves as a reservoir for fluid lubricant, 70, which preferably is maintained at a height sufficient to reach the gears 11, 16 and 18, which accordingly derive their lubrication directly therefrom.

The hubs 30 and 47 are preferably channelled, as at 71 and 72, to give access of the lubricant to the bearing studs 17 and 73, and the latter are provided with spiral channels 74, terminating in peripheral grooves 75 to which the lubricant is elevated by the rotation of hubs 30 and 48, passing from the grooves 75 to channels 76 by which it is conveyed by centrifugal force to the carrier seats 32 and thence flows by gravity down over the dogs 35, 36, 44 and the cam tracks 50, 52, 53, 55 and their associated parts, including the slide 57, gears 61 and 62, etc., so that all the co-acting parts are constantly flushed with lubricant, automatically. A cover-plate 77 prevents escape of the lubricant, and also avoids intrusion of dirt, and to a large extent of fibre given off by some of the materials being braided.

Any fibres which may enter through such openings as may be left in the path of the carriers, will be carried by the flow of lubricant and by centrifugal force toward the walls 3 and will descend there between the horizontal plate 112 and the walls 3, a depending flange 78 on the plate providing a peripheral sump within which the fibre is felted, as at 79, constituting a filter for the lubricant, which returns thence to the central reservoir, escaping beneath the flange 78, in a purified condition, being capable of repeated use without special attention.

In pursuance of another important object of the invention, means are provided to detect any breakage of thread and cause immediate stoppage of the machine.

As the now preferred form of means for this purpose, the braiding units B are provided (see Fig. 4) with devices comprising detector wires 80 having eyes or hooks 81 through which are led the threads 82 as they pass from the bobbins B to the braiding point 83. These detector wires are mounted in slideways 84 upon the heads 85 of the carriers $b^1$, etc., and each has an arm 86 extending inward to a plunger 87 mounted freely in a central bore 88 of the carrier, being supported, when the thread is intact, in the position shown in Fig. 4.

If a thread 82 breaks, the detector 80 and its plunger 87 falls, and as the carrier continues in its path, the plunger is soon brought into contact with one of a series of levers 89 (see Fig. 2) mounted pivotally at 90 upon posts disposed at intervals around the periphery of the casing. By a system of connecting levers 91, any of the levers 89 so actuated will operate a latch 92 connected with the shipping lever 15 and permit the latter to be thrown by a spring 93, throwing out the clutch 14 and shutting off the power from the shaft 7.

A spring 94 holds the latch 92 in position to maintain the shipping lever normally in the position to which it is moved by the operator in starting the machine, as shown in Fig. 2.

In place of the mechanical stop motion thus described, a magnetic tripping device of any well-known form may be provided for the shipping lever, and electrical contacts may be substituted for operation by the plungers 87 individually in place of the system of connecting levers 91. Each electrical contact will be included in an electrical circuit with the controlling magnet, and the desired effect of stopping the machine will be accomplished when any plunger 87 is allowed to fall by breakage of a thread.

A very sensitive stop motion is thus provided, and the impairment of product by flaws due to breakage of the braiding supply is avoided entirely.

The braiding units B may be of any suitable number and construction, and while a product of great variety and unusually perfect quality can be secured by the use of the braiding units shown in the drawings, it is to be understood that the specific form shown by way of example is not necesary to the carrying out of the invention comprising the features already set forth.

The braiding units are each provided with a filling supply device and while any convenient form of filling supply device may be used, I have devised and illustrated as the preferred form of device, embodying certain features of my invention, a dead spindle $s$ screwed through the plate 85 and through a threaded boss $s^1$ extending upward from the head of the post 88, being preferably disposed eccentrically so as to balance to a certain extent the weight of the let-off mechanism now to be described.

The thread from the bobbin B is led off through a tension device which constitutes an important feature of the invention and which comprises jaws $s^2$ and $s^3$ between which the thread 82 passes, being led as already described, through the detector 81 and thence upward through eyes $s^4$ and $s^5$ toward the braiding point 83, best seen in Fig. 1.

In pursuance of my invention, I provide means for causing the jaws $s^2$ and $s^3$ to have a relative movement which permits them to be pressed yieldingly toward each other, thus tending to retard the thread passing therebetween, and for this purpose, I have shown the lower jaw as maintained normally pressed against the upper jaw by means of a coilspring $s^6$ interposed between the jaw and the collar $s^7$ mounted upon a post $s^8$, which derives its support from a socket 84 constituting part of the plate 85, as shown in Fig. 4. The position of the collar $s^7$ upon the post $s^8$ may be adjusted by means of a pin or setscrew $s^9$, and when once adjusted the jaws $s^2$ and $s^3$ exert a normally constant retardation of the thread 82 passing therethrough.

In further pursuance of the invention, I have provided means acting at times to cause a relative opening movement between the jaws for the purpose of releasing the thread and thus to let it off as required for supply of the braiding machine or other mechanism in which it is to be used. Such means may take any convenient form.

As one suitable form of construction for the purpose, I have shown in the preferred embodiment illustrated, a lever $s^{10}$ pivoted at $s^{11}$ within a fork $s^{12}$ carried by the post $s^8$, the pivot being preferably formed as a bushing through which extends a wire $s^{13}$ bent to form a thread guide having the eye $s^4$, and a retaining parts $s^{14}$. The thread 82 after passing through the jaws $s^2$ and $s^3$ and through the detector 81 and guide $s^4$ is engaged with a hook $s^{15}$ formed upon the end of the lever $s^{10}$, as illustrated in the drawing, and passes out through the eye $s^5$ formed upon the end of a guide frame $s^{16}$ having upright members and a horizontal bow-shaped member $s^{17}$ which enters at $s^{18}$ into the lower part of the fork $s^{12}$.

A spring $s^{19}$ extending from the lever $s^{10}$ to a collar $s^{20}$ attached to the post $s^8$, serves to exert a constant downward draft upon the lever $s^{10}$, and tends to exert on the thread a constantly uniform tension, taking up any slack rapidly and completely.

The spring is not strong enough, however, to interfere with ready delivery of the thread for its intended use, and accordingly the lever may readily be drawn up into the position shown in Fig. 4 by the action of that part $82x$ of the thread 82 running between the eyes $s^4$ and $s^5$.

In the position illustrated in Fig. 4, the draft upon the thread $82x$ is sufficient not only to extend the spring $s^{19}$, but also to cause the heel $s^{21}$ of the lever $s^{10}$ to depress a rod or plunger $s^{22}$ which couples the lever $s^{10}$ with the lower jaw $s^2$, the rod passing down through an aperture $s^{23}$ provided for that purpose in the jaw $s^3$. The upper end of the rod works in a bearing formed by an aperture $s^{24}$ in the fork $s^{12}$.

The lever $s^{10}$ exerts a powerful action upon the rod, owing to the ratio of the long arm $s^{10}$ to the shorter arm $s^{21}$, and the extreme length of the lever $s^{10}$ gives it great capacity for taking up slack in the thread, and the point of connection of the spring $s^{19}$ near the fulcrum of the lever $s^{10}$ has the effect of causing very rapid movements of the lever $s^{10}$, and at the same time the leverage of the latter is sufficiently great to permit its operation easily by the thread without danger of breaking the latter.

Figure 3:
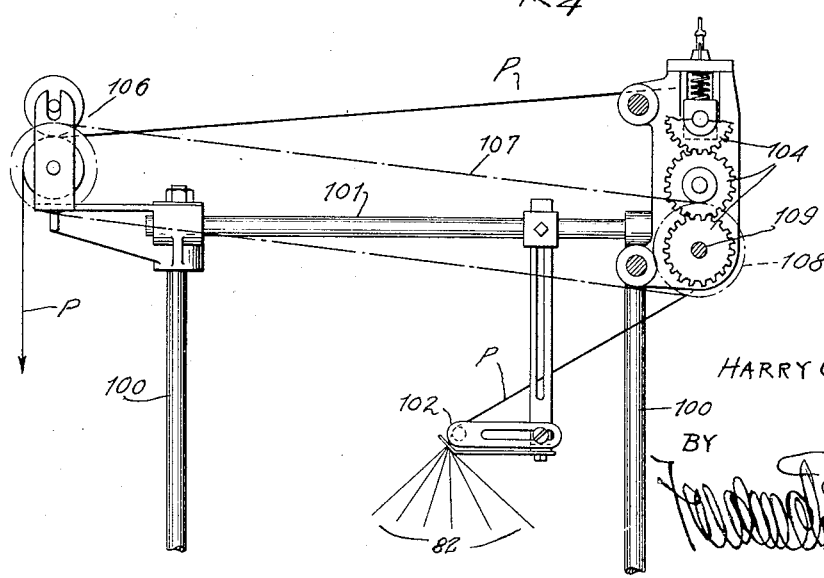
Fig. 3 is a fragmentary, detail view in vertical section, on the line 3—3 of the head of the machine shown in Fig. 1.

The overhead structure of the machine, shown in Figs. 1 and 3 constitutes one desirable form of construction to co-operate with the means herein described and claimed for actuation of the braiding units, and a brief designation of its parts will be sufficient to permit complete understanding of their intended use.

Upright posts 100, with horizontal members 101, serve to support a closing device 102 to which the braiding components 82, whether threads, wires, or other suitable components, are led from the units B, and the completed product P is drawn off through rolls 103 operated by gears 104 driven by a worm 105 on the upright shaft 9. The product is then led through a tension couple 106 (see Fig. 3) driven by a sprocket chain 107 actuated by a sprocket wheel 108 on the counter shaft 109 and delivered for accumulation in well-known fashion. A hand-wheel 110 may be provided to work the machine for adjustment when the power is shut off.

From the foregoing description and illustration, it will be seen that upon removal of the face plates 21$^a$, 22$^a$, etc., which can be effected readily by removal of the screws 29, after moving the carriers $b^1$, $b^2$, etc., from the face recesses 32, the latter will be exposed, together with the communicating hub slots 37, 38 and 46, containing the dogs 35, 36 and 44, so that the latter may be readily inspected without otherwise dismantling the machine.

So also, by removing the drivers from their bearing posts, 17, etc., the cams 41 will be exposed and may be removed from the plate 112, and may be replaced by other cams to vary the character of the braiding operation, without disturbing the underlying gears 16.

The above provisions render the novel braiding machine herein disclosed unusually easy to operate and to maintain in working condition.

As a cognate advantage of the structure disclosed, it is possible to employ carriers of very simple construction, inasmuch as the only portion of the carrier contained within the operating part of the machine is the flange 33, and this terminal flange may accordingly be made of suitable extent radially to afford a broad upper bearing surface for contact with the lower surface of the face plates 21$^a$, 22$^a$, etc., and to afford an equally broad lower bearing surface for engagement by the portions 43 and 44 of the dogs, and as the latter engage the terminal flanges directly beneath their region of engagement with the driver disks, the carriers and the braiding devices B supported thereby are firmly held for the braiding operation at all times, including the periods of transfer from disk to disk, making it possible to avoid undesirable tilting or other movements of the braiding devices relatively to the drivers. Any wear is taken by parts which are inexpensive, accessible, and easily replaced.

It is to be noted further that the important operation of releasing the holding devices at the transfer points is accomplished by a force of a continuous nature, viz.: centrifugal force, which increases with the speed of operation, so that the disconnection is assured unfailingly; and inasmuch as the coupling of the carriers to the plates is effected positively by the action of the cams upon the dogs, the latter are not subject to failure of operation from any cause; and finally the provision of bevelled shoulders upon the under surfaces of the carrier flanges makes it possible for the dogs to position the carriers with unfailing accuracy against the inner walls 31 of the peripheral recesses of the drivers.

I claim:

1. A braiding machine having rotary drivers adapted to operate upon braiding devices or carriers, actuating mechanism for said rotary drivers, and controlling mechanism therefor, said controlling mechanism comprising a shipping lever, means adapted to hold said shipping lever normally in position to permit actuation of said rotary drivers by said actuating mechanism, means to release said shipping lever to stop said actuation of said drivers, and detector means on said carriers individually adapted to actuate said releasing means, when the supply of braiding material upon a carrier is exhausted or fails to function normally, said detector means on each of the carrier comprising a centrally arranged plunger normally supported in an elevated position by the braiding material, and adapted to descend into position for engagement with the releasing means for the shipping-lever upon exhaustion of the material or failure of the material to function properly.

2. A braiding machine having rotary drivers adapted to operate upon braiding devices or carriers, actuating mechanism for said rotary drivers, and controlling mechanism therefor, said controlling mechanism comprising a shipping lever, means adapted to hold said shipping lever normally in position to permit actuation of said rotary drivers by said actuating mechanism, means to release said shipping lever to stop said actuation of said drivers, and detector means on said carriers individually adapted to actuate said releasing means, when the supply of braiding material upon a carrier is exhausted or fails to function normally, said detector means on each of the carriers comprising a centrally arranged plunger normally supported in an elevated position by the braiding material, and adapted to descend into position for engagement with the releasing means for the shipping lever upon exhaustion of the supply or failure of the material to function properly, and a system of levers connected with each other and with said releasing means for the shipping lever, said levers being adapted respectively to be engaged by any of said plungers upon descent of the latter.

3. A braiding machine having braiding devices or carriers and rotary drivers adapted to operate upon said braiding devices or carriers, actuating mechanism for said rotary drivers, and controlling mechanism therefor, said controlling mechanism comprising means adapted to permit actuation of said rotary drivers by said actuating mechanism, at times, and to stop said actuation of said drivers, at times, and detector means comprising centrally arranged plungers on said carriers individually adapted to actuate said stopping means, when the supply of braiding material upon a carrier is exhausted or fails to function normally.

4. In a braiding machine characterized as in claim 3, the combination with said controlling mechanism of let-off mechanism, comprising jaws constituting frictional means adapted to grip the thread or like material directly and thereby to retard delivery thereof, a tension device to take up slack in the material delivered from said retarding means, and connections between said tension device and jaws, whereby the retarding action is varied as the draft upon the material varies.

5. In a braiding machine characterized as in claim 3, the combination with said controlling mechanism of let-off mechanism, comprising jaws adapted to engage thread or similar material passing through said mechanism; means tending to cause relative approach of said jaws for contact with said material; a lever adapted to be engaged with the material as it passes from the jaws for use, and to be operated thereby so that the position of the lever is varied as the draft upon the material varies; means connecting the lever with one of said jaws, whereby the lever is adapted to separate the jaws sufficiently to release the thread when the tension of the latter operates the lever; and means tending constantly to move said lever to maintain uniform tension upon the thread.

6. In a braiding machine characterized as in claim 3, the combination with said controlling mechanism of let-off mechanism, comprising jaws adapted to engage thread or similar material passing through said mechanism; means tending to cause relative approach of said jaws for contact with said material; a lever adapted to be engaged with the material as it passes from the jaws for use, and to be operated thereby so that the position of the lever is varied as the draft upon the material varies; means connecting the lever with one of said jaws, whereby the lever is adapted to separate the jaws sufficiently to release the thread when the tension of the latter operates the lever; and means tending constantly to move said lever to maintain uniform tension upon the thread, said means acting to cause the jaws to grip the thread and retard delivery of the thread therefrom; and a detector adapted to engage the thread and to be held inoperative thereby, and detector-controlled means adapted to operate upon breakage of the thread and resultant movement of said detector device, acting to cause stoppage of the machine for which said supply mechanism is utilized.

7. In a braiding machine characterized as in claim 3, the combination with said controlling mechanism of let-off mechanism, comprising a pair of jaws between which thread or similar material may be passed; means tending to cause relative approach of said jaws into contact with the material; a lever adapted to be engaged with the material continuously as it passes from the jaws for use, the normal draft upon the material being sufficient to maintain the lever in an operative position; means connecting the lever with one of said jaws and acting, when said lever is in said operative position, to separate the jaws sufficiently to permit passage of a supply of material adequate for its intended purpose; and means tending constantly to move said lever away from said device to cause the lever to take up slack in the material, said movement also permitting the jaws to grip the material and retard passage of the same, thereby co-operating with said lever to maintain uniform tension upon the material.

8. In a braiding machine characterized as in claim 3, the combination with said controlling mechanism of a travelling supply-carrier comprising a support for a supply of thread or similar material, and in combination therewith a retarding mechanism mounted upon said travelling carrier adapted to grip said thread directly and thereby to retard delivery of the material from said supply, a device adapted to take up slack in the material delivered from said retarding device, and connections between said take-up device and retarding device whereby operation of said take-up device acts to vary the operation of said retarding device as the draft upon the material varies, said retarding device and take-up device co-operating to maintain uniform tension upon the material delivered.

9. In a braiding machine characterized as in claim 3, the combination with said controlling mechanism of a supply-carrier, comprising a support for a supply of thread or similar material, and in combination therewith a retarding mechanism adapted to grip said material directly and thereby to retard delivery of the material from said supply, a device adapted to take up slack in the material delivered from said retarding device, and connections between said take-up device and retarding device whereby operation of said take-up device acts to vary the operation of said retarding device as the draft upon the material varies, said retarding device and take-up device co-operating to maintain uniform tension upon the material delivered, said supply-support, retarding device and take-up device constituting a unitary structure adapted for use as such in apparatus of the class described, and removable readily therefrom.

10. In a braiding machine characterized as in claim 3, the combination with said controlling mechanism of a supply-carrier, comprising a support for a supply of thread or similar material and in combination therewith a let-off mechanism comprising a pair of jaws between which thread or similar material may be passed; means tending to cause relative approach of said jaws into contact with the material; a lever adapted to be engaged with the material continuously as it passes from the jaws for use, the normal draft upon the material being sufficient to maintain the lever in an operative position; means connecting the lever with one of said jaws and acting, when said lever is in said operative position, to separate the jaws sufficiently to permit passage of a supply of material adequate for its intended purpose; and means tending constantly to move said lever away from said device to cause the lever to take up slack in the material, said movement also permitting the jaws to grip the material and retard passage of the same, thereby co-operating with said lever to maintain uniform tension upon the material.

11. In a braiding machine characterized as in claim 3, the combination with said controlling mechanism of a supply-carrier, comprising a support for a supply of thread or similar material and in combination therewith a let-off mechanism comprising a pair of jaws between which thread or similar material may be passed; means tending to cause relative approach of said jaws into contact with the material; a lever adapted to be engaged with the material continuously as it passes from the jaws for use, the normal draft upon the material being sufficient to maintain the lever in an operative position; means connecting the lever with one of said jaws and acting, when said lever is in said operative position, to separate the jaws sufficiently to permit passage of a supply of material adequate for its intended purpose; and means tending constantly to move said lever away from said device to cause the lever to take up slack in the material, said movement also permitting the jaws to grip the material and retard passage of the same, thereby co-operating with said lever to maintain uniform tension upon the material, said support and let-off mechanism constituting a unitary structure adapted for use as such in apparatus of the class described, and removable readily therefrom.

12. In a braiding machine characterized as in claim 3, the combination with said controlling mechanism of a supply-carrier, comprising an upright support for a bobbin of thread or similar material, and in combination therewith a let-off mechanism comprising a post provided with a pair of jaws positioned medially of the periphery of said bobbin and between which said material may be passed; a compression spring on said post tending to cause relative approach of said jaws into contact with the material, a lever fulcrumed near the upper end of said post and adapted to be engaged with the material continuously as it passes from the jaws for use, the normal draft upon the material being sufficient to maintain the lever in an operative position and a thrust-rod connecting the lever with one of said jaws and acting when moved by said lever against the action of said spring to compress the same and to separate the jaws sufficiently to release said material, a tension spring tending constantly to move the lever to take up slack in the material, said movement also permitting said compressed spring to close the jaws to grip the material and retard passage of the material therefrom, a detector adapted to engage the material at the region of delivery from said jaws and to be held thereby out of operative position, breakage of the material permitting said detector device to drop, and a plunger, centrally disposed below said carrier and connected with said detector, being adapted when dropped to cause stoppage of the machine for which said supply mechanism is utilized; said bobbin support and let-off mechanism being arranged in balanced relation, and said lever being mounted to operate in proximity to the axis of said supply-carrier and said instrumentalities co-operating to deliver said material under uniform tension at a region adjacent to said axis.

13. In a braiding machine characterized as in claim 3, the combination with said controlling mechanism of a supply-carrier, comprising a support adapted to receive a supply of yarn or similar material in the form of a cop, and means to deliver said yarn under uniform tension.

In testimony whereof, I have signed this specification.

HARRY G. ROBINSON.